March 25, 1958  G. C. FULLER  2,827,706
MAGNETIC GAGE BLOCKS
Filed Nov. 17, 1955
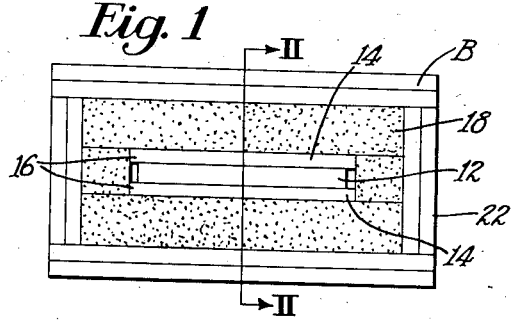
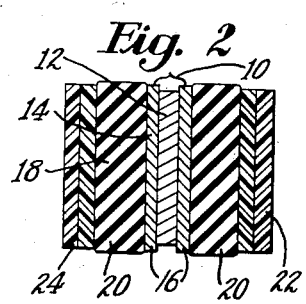 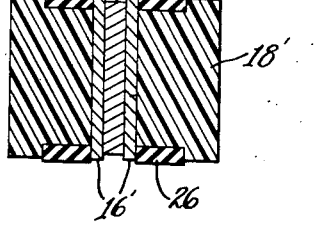
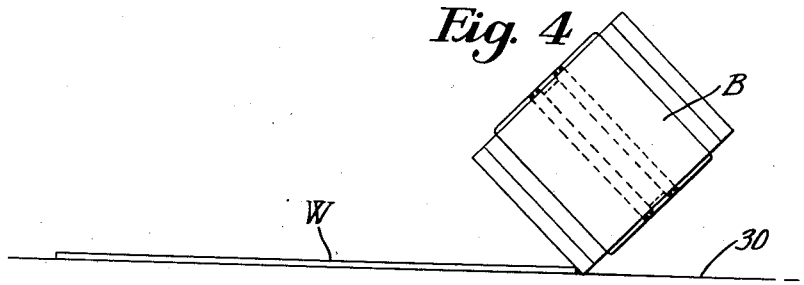
*Inventor*
George C. Fuller
By his Attorney

United States Patent Office 2,827,706
Patented Mar. 25, 1958

2,827,706
MAGNETIC GAGE BLOCKS

George C. Fuller, Wellesley, Mass., assignor to United Shoe Machinery Corporation, Boston, Mass., a corporation of New Jersey Application November 17, 1955, Serial No. 547,374

3 Claims. (Cl. 33—168)

This invention relates to improvements in work-rest gages and more particularly it relates to a magnetic gage block adapted for releasable attachment to the surface of a ferromagnetic work support for use in facilitating the positioning of work pieces in rapid succession on such a support.

The increased employment of machines for performing an operation upon runs of work pieces which are serially presented and disposed manually upon a table of the machine as fast as the operator can manipulate them has greatly increased the need for efficient, convenient and inexpensive means for assisting an operator of such a machine properly to dispose the work pieces rapidly and accurately on the machine work support. Gages or stops against which the operator may set the work pieces are of great help. In such service, gages are necessarily subject to severe usage, as the work pieces may be thrust against the gages at a variety of angles and speeds. Present gage means adequate for the task are believed to be relatively expensive and inconvenient for the frequent adjustment required in switching from one run of work pieces to another.

Accordingly, it is an object of the invention to provide an improved gage which is convenient to use, rugged, accurate and inexpensive.

To this end and in accordance with a feature of the invention there is provided a magnetic gage block comprising a permanent magnet supported upon resilient friction treads by a body member secured to the magnet, the pole surfaces of the magnet being recessed from the tread surface. In a preferred embodiment of the invention the block has smooth hard side faces perpendicular to the tread surface.

In accordance with another feature of the invention, facilitating disposition of the gage block on the surface of a work support and facilitating its release therefrom, the gripping face of the magnet extends in a narrow area centrally of the gage block while the body member extends on both sides of the gripping face at least the width thereof so that an upward lift on a side face will have a mechanical advantage over the pull of the magnet with respect to a fulcrum at the lower edge of the other side face during release of the gage block from a support.

Other features and advantages of the invention may best be understood from the following specification taken in connection with the appended drawings in which:

Fig. 1 is a plan view of a gage block embodying the present invention;

Fig. 2 is a section taken on line II—II of Fig. 1;

Fig. 3 is a similar section of a modification of the block shown in Fig. 1; and

Fig. 4 is an end elevation of the block of Fig. 1 illustrating a method of positioning the block in operative disposition.

Referring to Figs. 1 and 2, the embodiment of the invention therein illustrated comprises a sandwich-like permanent magnet 10 (Fig. 2) which conveniently may comprise a face-polarized layer 12 of magnetic material glued with epoxy resin to rectangular soft steel pole pieces 14 which serve to conduct the flux from the layer 12 to coplanar pole surfaces 16 around the edge of the magnet. The magnet illustrated employs for the magnetic material a ceramic of iron and barium oxide commercially available as Indox I. This material is rather susceptible of damage and accordingly the pole pieces 14 overlap the ceramic as a measure of protection therefor. As best seen in Fig. 1, the exposed pole surfaces 16 of the pole pieces 14 define a rectangular gripping face extending, adjacent the bottom surface of the block, the length and width of a side of the magnet 10.

Such a magnet is capable of gripping the surface of a steel work table with a large value of magnet pull but is incapable by itself of sustaining impacts tending to slide or twist the magnet on the support. In order to provide a secure grip of the gage block on a work table, the block additionally comprises a body member broadly designated 18 in the figures which includes treads 20 of resilient material having a relatively high co-efficient of friction. I have found that durometer 50 and softer rubber is quite satisfactory for this purpose. The tread surface of the body member is contoured to conform with the surface of the work support and the body member is secured by adhesive to the magnet 10 so that the pole surfaces 16 are recessed from the tread surface whereby in operative disposition on a machine table, the block is supported on the friction treads 20. The recessing of the pole surfaces from the tread surface should be very small and should have regard both for the great effect of an air gap and for the deformability of the treads under the pull of the magnet. The recessing should be only enough to insure that in operative disposition, wherein the attraction of the magnet to the work support tends resiliently to deform the treads and allows the gripping face of the magnet to approach the support surface, substantially the maximum pull of the magnet is supported on the treads. I have found it convenient to employ a spacing of about .005" to .010" in the construction shown in Figs. 1 and 2.

To provide a hard smooth flat side face for the block, the body member comprises side walls 22 of hard non-magnetic material such as Textolite. The provision of such a surface is of great advantage where a work piece is slid along the side of one gage block into abutment with the side face of another gage block. The side walls 22 are recessed slightly at their bottom surfaces 24 from the plane of the surfaces of the treads 20 so that the walls will not support any of the magnetic pull of the block to detract from its grip on a work support.

In the modification shown in Fig. 3, the body member 18' is constructed entirely from hard non-resilient and non-magnetic material except for treads 26 which may conveniently be disposed in channels adjacent to the magnet 10'. In this construction, the body member and the pole surfaces 16' may conveniently be ground flush initially and the treads 26 thereafter inserted in the channels, the treads being of sufficient thickness that the pole surfaces are recessed slightly from the tread surface.

Where it is desired accurately to dispose the gage block on a machine table to assist the manipulation of work pieces, such as the positioning of wiring panels on the table of a resistor inserting head, the method shown in Fig. 4 may be employed. As shown in this figure, a work piece W is initially disposed on the table 30 of the machine in the position which each of a succession of work pieces is to occupy during an operation thereon. Assuming that the work piece is rectangular, the gage block B is then set in a tipped position with its lower edge against the edge of the work piece and lowered smoothly while the lower edge is slid into abutting relation with the edge of the work piece. Since the outer face of the gage block is a hard material, the sliding is accomplished with very little lateral pressure and the block comes to rest on the table in accurate position for gaging the position of work pieces thereafter. Conveniently two gage blocks may be employed to gage two adjacent sides of a rectangular work piece.

In removing the gage block, an upward pull on one side face of the gage block is assisted in releasing the block from the table by the mechanical advantage obtained from employing the bottom edge of the other side face as a fulcrum and by the fact that the gripping face of the magnet is narrow with respect to the width of the block.

Having thus described my invention, what I claim as new and desire to secure by Letters Patent of the United States is:

1. A magnetic gage block adapted for releasable attachment to the surface of a ferromagnetic work support comprising, in combination, a permanent magnet having coplanar pole surface of opposite polarity, and a body member having a flat tread surface of resilient material having a relatively high co-efficient of friction secured to said magnet with said pole surfaces recessed from the tread surface, said body member having a hard smooth flat side face perpendicular to the tread surface.

2. A magnetic gage block adapted for releasable attachment to the surface of a ferromagnetic work support comprising, in combination, a permanent magnet having coplanar pole surfaces of opposite polarity and a body member having a flat tread surface of resilient material having a relatively high co-efficient of friction secured to said magnet with the pole surfaces recessed from the tread surface, said body member comprising hard non-resilient material providing a hard smooth side face, said non-resilient material being recessed slightly from the plane of the tread surface of the member.

3. A magnetic gage block adapted for releasable attachment to the surface of a ferromagnetic work support comprising, in combination, a permanent magnet having coplanar pole surfaces of opposite polarity defining a rectangular gripping face and a body member of nonmagnetic material secured to said magnet and extending on both sides of said gripping face at least the width thereof to a flat side face having an edge operative as a fulcrum upon which the block may be tipped into and out of operative disposition on a support, said member having friction threads on each side of the gripping face on which the block is supported in operative disposition.

References Cited in the file of this patent

UNITED STATES PATENTS

| | | |
|---|---|---|
| 2,217,514 | Henry | Oct. 8, 1940 |
| 2,448,692 | Teetor | Sept. 7, 1948 |
| 2,666,352 | Phillips | Jan. 19, 1954 |
| 2,686,371 | Flis | Aug. 17, 1954 |